INVENTOR
ANDRE CANTELOUBE
By Young + Thompson
ATTYS.

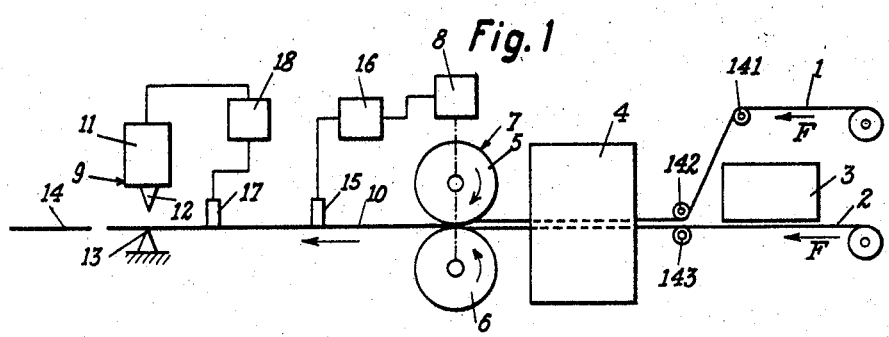
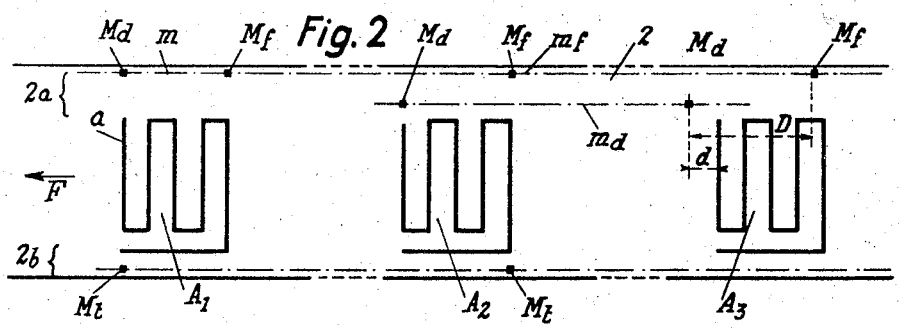

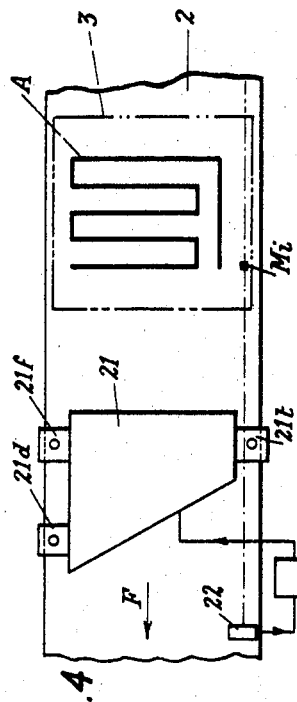
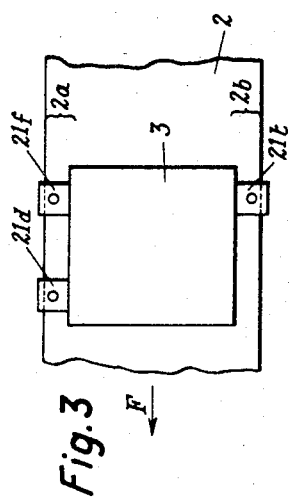
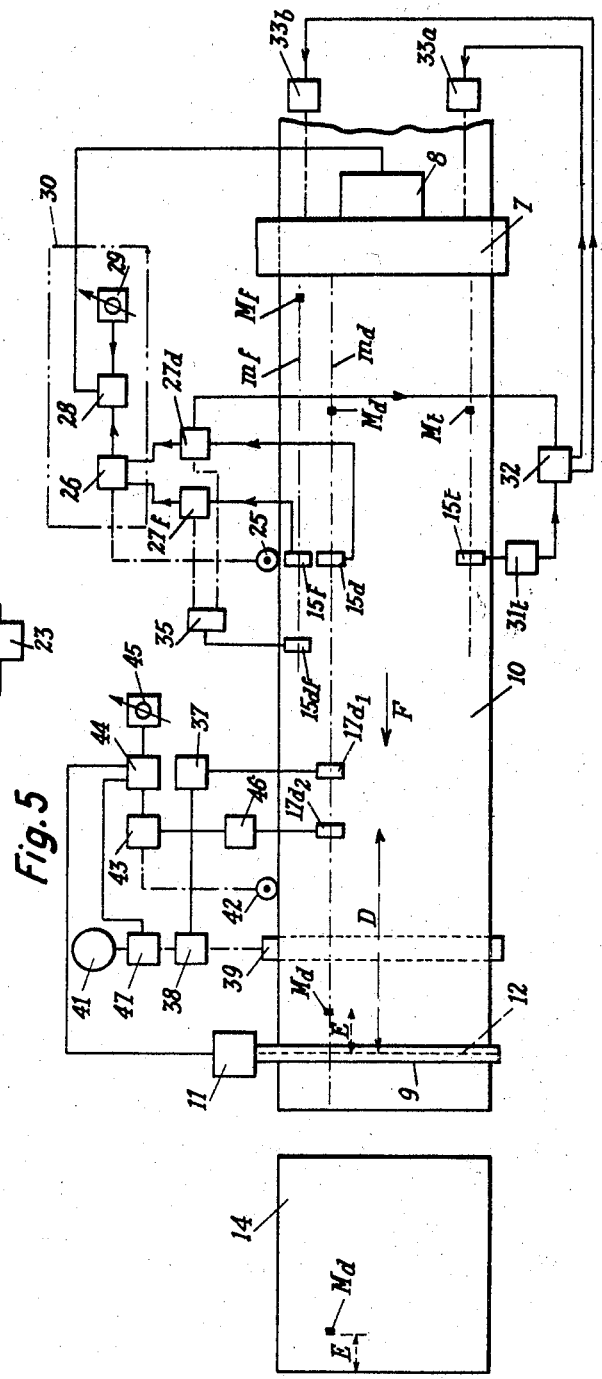

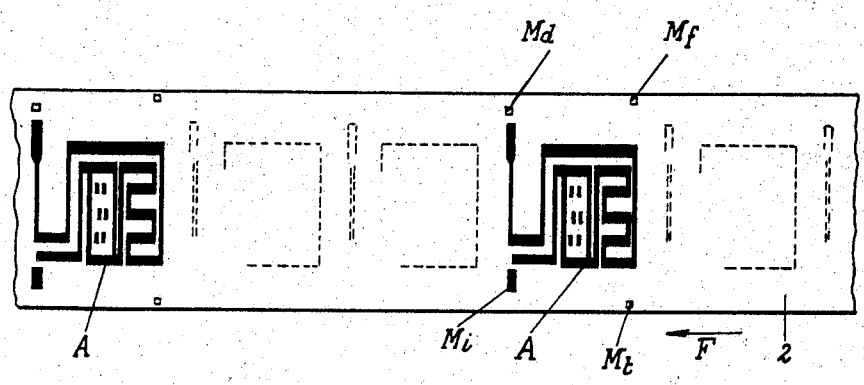
Fig. 8
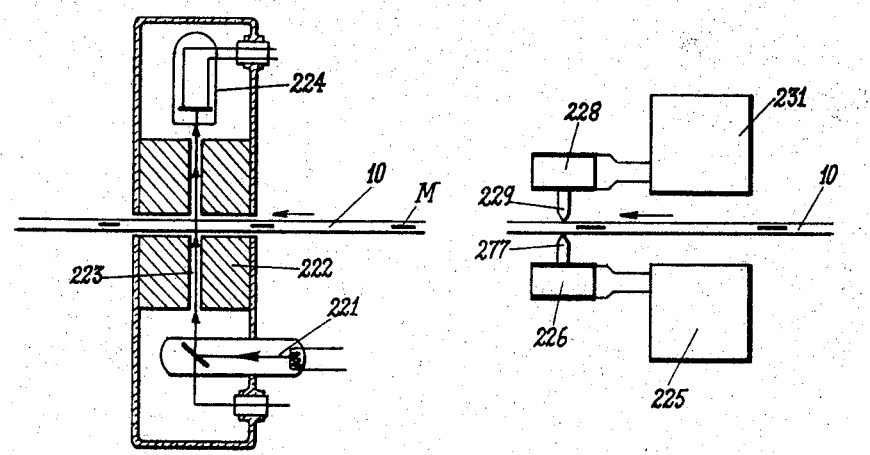
Fig. 22
Fig. 23
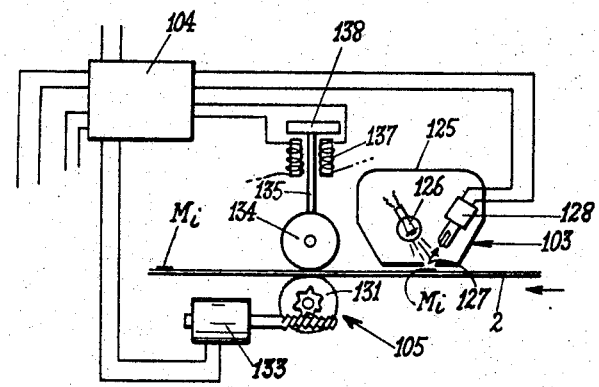
Fig. 14

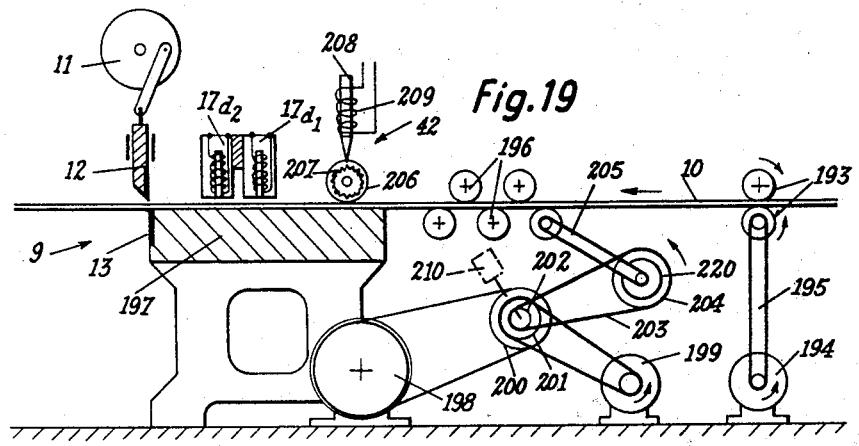
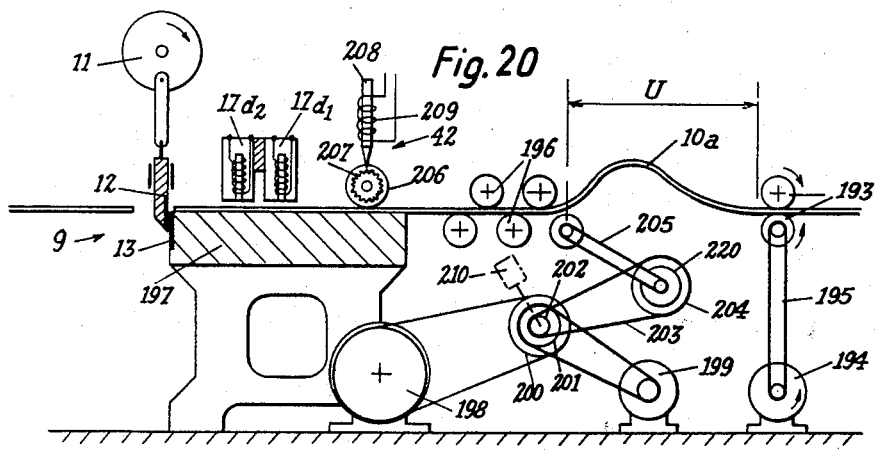

United States Patent Office 3,442,001
Patented May 6, 1969

3,442,001
PROCESS AND APPARATUS FOR THE AUTO-
MATIC MANUFACTURE OF PANELS WITH
INTEGRATED TUBE-CIRCUITS
André Canteloube, 10 Ave. de Bretteville, Neuilly-sur-
Seine, Hauts-de-Seine, France
Continuation-in-part of abandoned application Ser. No.
510,786, Dec. 1, 1965. This application Jan. 11, 1968,
Ser. No. 697,133
Claims priority, application France, Feb. 28, 1961,
854,128, Patent 1,290,251
Int. Cl. B23q 17/18; B23p 17/00
U.S. Cl. 29—407    34 Claims

ABSTRACT OF THE DISCLOSURE

A process and apparatus for the automatic and continuous manufacture of intermediate panels comprising integrated tube-circuits by means of two strips delivered continuously and applied against each other by rolling after printing on one of the opposite faces of said strips a tube-circuit pattern formed of a material which prevents adhesion of said faces. The strip on which the tube circuits are printed is provided prior to rolling with a marking which is retained after rolling and which comprises in respect of each tube circuit at least one mark positioned in a predetermined manner with respect to said tube circuit. The position of the mark is detected after rolling but prior to cutting of the strip into panels and the cutting operation is controlled as a function of the length of strip which is delivered after transition of the mark which has thus been detected.

---

This application is a continuation-in-part of my application Ser. No. 510,786 filed Dec. 1, 1965, now abandoned, which is itself a continuation-in-part of my application Ser. No. 175,939 filed Feb. 27, 1962, now abandoned.

This invention relates to a process and an apparatus for the automatic and continuous manufacture of intermediate panels which can subsequently be converted by inflation into panels comprising integrated circulation systems, hereinafter referred to as tube circuits. As is already known, panels of this type are employed for heat exchangers and especially in the construction of evaporators and condensers.

As is well known, panels of the integrated tube-circuit type are already fabricated by means of a batch process which consists in bonding two superposed metallic sheets in a rolling operation after an anti-adhesive product has first been deposited on one sheet by printing along a line which corresponds to the desired tube layout of the heat exchanger, taking into account the deformation of the sheets at the time of rolling.

Inflation of the tube circuit is then carried out by injecting fluid under pressure, thereby producing a non-elastic deformation of the sheets at all points at which said sheets are not bonded to each other.

It has already been proposed to manufacture in a continuous manner intermediate panels formed by two coupled plates between which the pattern of non-adhesive products is disposed for the purpose of forming the tube circuit which is intended to be subsequently inflated. This process consists in continuously winding-off two bands or strips, in printing the tube circuit on that face of one of the strips which is directed towards the other, then in rolling the two strips together, said strips being then cut transversely.

However, the practical application of such a process has not proved feasible up to the present time since the position of the printed tube circuit between the plates cannot be determined with precision, taking into account the variations in elongation which occur during rolling and during the heat-treatment operations which are performed both before and after the rolling operation. As a consequence, the cutting-out operation can be performed only in a somewhat uncertain manner between the two tube-circuit layouts, with the result that the intermediate panels which are intended to be inflated cannot be produced with the necessary industrial uniformity.

The present invention is concered with improved means whereby the operations entailed in the fabrication of intermediate panels can be carried out in a fully automatic and continuous manner under the best conditions of regularity and precision, the finished panel being then directly obtained by inflation.

In accordance with the invention, the process for the automatic and continuous manufacture of intermediate panels comprising integrated tube-circuits by means of two strips delivered continuously and applied against each other by rolling after printing on one of the opposite faces of said strips a tube-circuit pattern formed of a material which prevents adhesion of said faces is characterized in that the strip on which the tube circuits are printed is provided prior to rolling with a marking which is retained after rolling and which comprises in respect of each tube circuit at least one mark positioned in a predetermined manner with respect to said circuit, in that the position of said mark is detected after rolling but prior to cutting of the strip, and in that said cutting operation is controlled as a function of the length of strip which is delivered after transition of the mark which has thus been detected. Consequently, it is possible to ensure uniform cutting of intermediate panels which are thus suitable for industrial utilization.

In a preferred embodiment of the invention, two marks separated by a know spatial interval are associated with each printed tube-circuit prior to rolling, any relative positional difference between said two-marks is measured after rolling and the pressure applied by the rolling mill is regulated as a function of the difference thus measured.

The two marks thus make it possible to control the rolling mill so that the elongation of the printed tube-circuit remains constant and equal to a predetermined standard length. It is an advantage to place one of the marks in the vicinity of the head of the tube circuit and the other mark in the vicinity of the end of said circuit.

Preferably, the marking of the strip is carried out by insertion of a pellet having a composition which is different from that of the strip, the detection being carried out as a result of the disturbance produced by the pellet on scanning radiation which passes through the strip.

In particular, the scanning radiation can consist of a beam of electromagnetic radiations, of X-rays, of ultrasonic waves, the detector being designed accordingly. Regardless of the method of marking and correlative detection which is adopted, it is an object of the invention to control the total roll pressure of the rolling mill as a function of the error signal constituted by the difference after the rolling operation between the spacing of the two marks corresponding to the beginning and end of the tube circuit and the standard length which is established for the tube circuit.

In a preferred embodiment of the process, if the marking which serves for the position-setting of the tube circuits is carried out close to one edge of the strip, a transverse mark is disposed opposite to one of the two beginning and end marks in the vicinity of the opposite edge of the strip, any relative positional difference between the two initially aligned marks is measured after rolling and the differential pressure applied by the rolling mill is regulated as a function of the difference thus measured.

The invention also extends to an apparatus for the automatic and continuous manufacture of intermediate panels of the integrated tube-circuit type and comprising means for winding-off two strips, printing means for applying the pattern of the tube circuit on one of the strips, rolling means which compresses the two strips and thus imprisons the printed tube circuit therebetween, said apparatus being characterized in that it comprises means for marking one of the strips in correlation with the position of the printed tube circuit, said marking means comprising at least one marker which is capable of applying on the strip at least one mark in correlation with the position of each tube circuit, said mark being retained after the execution of the rolling process, shearing means for cutting in the transverse direction the strip which is placed downstream of the rolling mill, at least one detector which is also placed downstream and which is capable of detecting the passage of said marks and a followup system which is operated under the control of said detector and which in turn controls the actuation of the blade of the shearing means. This arrangement permits of automatic control of the shearing means which cuts the strip into intermediate panels.

In an advantageous embodiment, the apparatus comprises two markers which are capable of applying on the strip two marks corresponding respectively to the beginning and the end of each tube circuit and comprises in addition to the detector which controls the shearing means at least one detector which is placed between the rolling means and the shearing means and which is capable of selectively detecting the passage of said marks and a means for controlling the roll pressure in both magnitude and in direction, this latter means being controlled by the aforesaid detector.

In a preferred embodiment of the apparatus which is intended to permit of fully automatic production of the intermediate panels, the rolling means comprises means for controlling the roll pressure at each stand and the marking device comprises three markers which are capable of applying on the strip respectively the marks of the beginning and end of a tube circuit and a third mark in transverse alignment with one of the aforesaid marks and placed in the vicinity of the edge of the strip opposite to the edge which bears the aforesaid mark. Provision is made in addition for at least two detectors which measure after the rolling operation the relative positional difference from one edge to the other between the two marks which were initially aligned, and means for controlling differentially the lateral roll pressure as a function of the measurement of said difference.

There is thus carried out at the same time the rolling of the composite strip at the requisite roll pressure and any twisting or snaking of the strip which might result from dissymetrical roll pressure which is in turn produced by mechanical and thermal deformations of members such as rolls, bearings, stands, clamping screws and the like.

In a preferred mode of execution of the invention, the strip-printing unit comprises means for applying on said strip at least one intermediate mark which is printed in positional correlation with the tube circuit and the marking unit comprises a frame carrying three markers placed downstream of the printing unit and an optical electronic device for detecting the intermediate printed mark and for controlling said markers.

Further properties and advantages of the invention will become apparent from the description which follows below, reference being had to the accompanying drawings which are given by way of non-limitative example, and in which:

FIG. 1 is a very diagrammatic view in side elevation of an apparatus in accordance with the invention;

FIG. 2 is a plan view of one of the strips after printing of the tube circuits and marking;

FIG. 3 is a diagrammatic plan view corresponding to a particular mode of marking;

FIG. 4 shows, as in FIG. 3, a second mode of marking;

FIG. 5 is a more detailed diagrammatic plan view of an apparatus in accordance with the invention;

FIG. 8 is a view which is similar to FIG. 3 and showing the printed tube-circuits;

FIG. 14 is a diagrammatic view in elevation showing the mark-detection means of the device referred to above;

FIG. 19 is a view in side elevation showing one embodiment of a shearing machine during the progression of the strip;

FIG. 20 is a view of the aforesaid shearing machine at the moment of cutting of the strip;

FIG. 22 shows diagrammatically a detector of the X-ray type;

FIG. 23 is a similar diagrammatic illustration of a detector of the ultra-sonic wave type.

Figure 6:
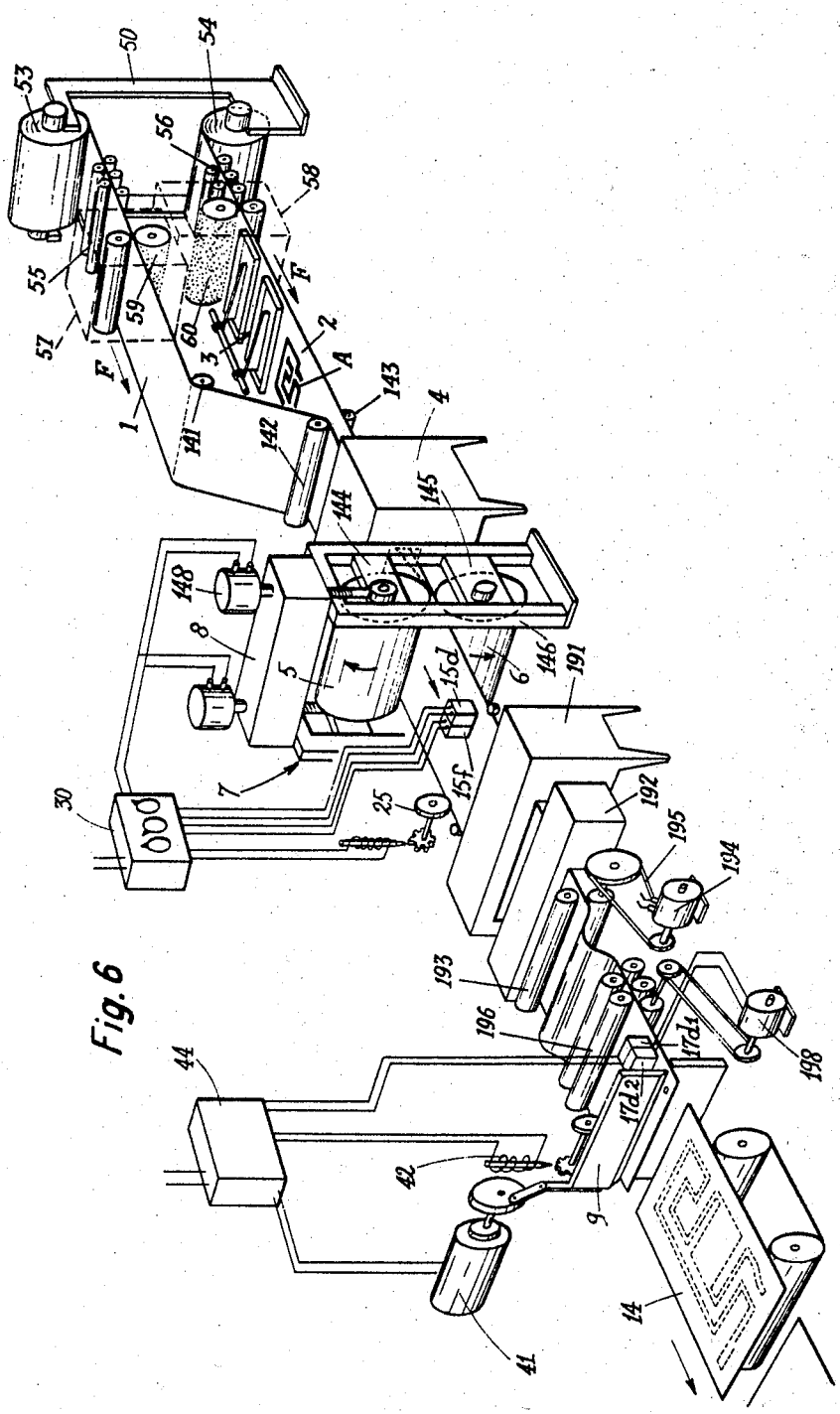
FIG. 6 is a view in perspective showing an apparatus in accordance with the invention.

Referring to FIGS. 1 and 2 of the accompanying drawings, the essential features of the process and installation according to the invention will first be described.

In FIG. 1, there can be seen at 1 and 2 the two strips to be processed (which are fabricated from sheet metal, either of aluminum and aluminum-base alloy, copper and copper-base alloy or steel, or from a band of flexible synthetic material such as polyvinyl chloride, for example). The strips 1 and 2 can be of different composition and thickness, with the result that the subsequent panel can be endowed with different mechanical and physical properties on its two faces and can be subjected to different deformations at the moment of expansion of the ducts.

The strips 1 and 2 are wound off in continuous motion in the direction of the arrow F. The face of one of the strips such as the strip 2 which is directed towards the other strip 1 passes beneath a printing unit 3 which applies thereon an impression corresponding to the tube circuit A (shown in FIG. 2) such as a flat or snaked coil for evaporators or cooling condensers.

The tube circuit A can be printed in a number of different ways; the printing process consists in depositing a layer of anti-adhesive substance in the requisite location for the subsequent formation of the integrated tube-circuit ducts.

The printing material consists of a substance which prevents adhesion of the strips 1 and 2. This result is preferably obtained by means of a substance which does not provide a simple screen effect but permits of active molecular adhesion to the corresponding surfaces and therefore has the advantage of forming films which are highly adhesive at high temperatures and pressures. A printing material having a molybdenum disulphide base is wholly satisfactory for the purpose, especially in the case in which the strips 1 and 2 are fabricated from aluminum and aluminum-base alloys.

The printing substance can also consist in known manner of an ink of the aqueous or organic solvent type (ethylene glycols) which contains in suspension a pigment such as graphite or talc.

After printing, the strips 1 and 2 pass through a heating enclosure 4 (which is in any case an optional arrangement), are thus brought to the requisite temperature and then passed between the rolls 5 and 6 of a rolling mill 7, the screw-down rig of which is shown diagrammatically at 8.

The two strips 1, 2 which are thus intimately bonded and constitute a composite strip 10 then progress beneath a shearing machine 9 in which the actuating device 11 releases the moving shear blade 12 which passes in front of the backing blade 13 and cuts the two assembled strips so as to form the intermediate panels 14 which contain the printed tube-circuit A. These panels are then subjected to inflation of the tube circuit A by means which are not shown in the drawings.

In accordance with the present invention, provision is made for automatic control of the rolling mill 7 and of the shearing machine 9 by marking the strip 2 which bears the tube circuit A before said strip passes through the heating enclosure 4, the marking operation being carried out in close correlation with the geometrical position of the tube circuit A on the strip 2. An essential condition is that the marking must be retained to a sufficient extent during subsequent treatment operations and especially after rolling to permit of easy detection and to permit the follow-up control of the rolling mill 7 and of the shearing machine 9.

Provision is made on the downstream side of the rolling mill 7 for a detection unit 15 which serves to detect the marks carried by the strip 10. The detection unit 15 also controls the operation of the screw-down rig 8 by means of a follow-up system 16.

Provision is made upstream of the shearing machine 9 for another detection unit 17 which controls by means of another follow-up system 18 the unit 11 which actuates the moving shear blade 12.

The following modes of marking in particular are contemplated by the invention, whilst the modes of detection are established correlatively in order that detection should be performed with maximum accuracy and fidelity.

| Mode of marking | Mode of detection (detectors 15 and 17 in particular) |
|---|---|
| (a) Mechanical punching of the strip (with or without through-perforation). | Mechanical feeler which is responsive to mechanical non-continuity when passing over the punched portion. |
| (b) Deposition of a liquid or paste substance containing traces of radioactive particles or a pellet (for example as a result of contact irradiation). Preferably, the radioactive agent has a short effective half-life in order to limit the danger of exposure of personnel to radiation. | Radioactivity detector such as a scintillation counter, Geiger counter. |
| (c) Deposition of a substance (such as micro-particles of lead or silica, for example) which is opaque to X-rays. This solution is of particular advantage in the case of plastic material which has a low X-ray absorption capacity. | X-ray detector, a source from which a focused beam is directed through the strip. |
| (d) Attachment or insertion in the strip, of a pellet formed: |  |
| Of magnetic metal when the strip itself is non-magnetic. (For example a pellet of ferro-magnetic material with strips of aluminum-base alloy). | Electromagnetic pick-up. |
| Of metal which has lower permeability to X-rays than the strip. | X-ray detector as in (c). |
| Of a material which is different from that of the strip. | Ultra-sonic pick-up which serves to reveal phenomena of decohesion or detachment and works on the principle of reflection or transmission of a beam of ultra-sonic waves. |

In particular, in the case of methods *b* and *c*, the invention makes it possible to associate the marking with the actual printing of the tube circuit provided that the substance which is non-transparent to X-rays or radioactive radiations is compatible with the nature of the anti-adhesive ink employed, in which case the detectors 15 and 17 are suitably focused in order to cover only a narrow zone of the strip 2.

Aside from the basic assumptions stated above, the invention consists in disposing the marks in the form of spots of small area (for example square spots having an area of 0.1 to 0.5 cm.$^2$).

The marks M are preferably disposed along one of the borders 2a, 2b or along the two borders of the strip 2 (shown in FIG. 2) and said marks are placed in geometrical correlation with the position of the tube circuit A.

In particular, the invention consists in placing a tube-circuit commencement mark $M_d$ and a tube-circuit end mark $M_f$, these two marks being respectively located opposite to the beginning and end of the outlay of tube circuit A.

The marks $M_d$ and $M_f$ are, for example, located in the same border 2a and can also be aligned on the same track $m$ as contemplated in the case of the circuit $A_1$, or else they can form part of two different tracks $m_d$, $m_f$ as contemplated in the case of the tube circuit $A_2$, the first track $m_d$ being located in proximity to the tube circuit $A_2$ whilst the second track $m_f$ is located in the vicinity of the edge of the strip 2. However, it is readily apparent that only one form of marking is adopted once and for all.

According to another feature of the invention, provision is advantageously made for a third transverse mark $M_t$ in the case of each tube circuit A, this mark being placed in alignment with one of the two marks $M_d$, $M_f$ and therefore parallel to the legs $a$ of the tube circuit A. In the case of the first tube circuit $A_1$, it has been assumed that the marks $M_d$ and $M_t$ were in oppositely-facing relation; in the case of the second tube circuit $A_2$, the marks $M_f$ and $M_t$ are in alignment. In this case also, a choice is made once and for all in a single installation. The intended function of the mark $M_t$ is to permit in correlation with the mark located in the vicinity of the other edge of the strip 2 an automatic adjustment of the differential pressure of the rolling mill 7 in order to provide remedial action for defective squaring as will be explained hereinafter.

As is readily apparent, it is not necessary to ensure that the mark $M_d$ is located strictly opposite to the first leg of the tube circuit A. Said mark could be placed at a predetermined distance $d$ from this latter provided that this condition is satisfied with precision. This arrangement is provided in the case of the third tube circuit $A_3$.

Furthermore, the tube-circuit end mark $M_f$ can be placed without particular reference to one of the legs of the tube circuit on condition that it is located at a constant predetermined distance D from the commencement mark $M_d$, said distance D having a sufficient value to permit of accurate measurement of the distance existing between the marks $M_d$, $M_f$ after rolling. In practice, the distance referred-to must be of the same order of magnitude as the length of the circuit A.

So far as concerns the execution of the marking in correlation with the printing of the tube circuit A, two modes of operation are contemplated by the invention:

In a first method (shown in FIG. 3), the marking is carried out at the same time as the printing of the tube circuit A by conjoint operation of the printing unit 3 with the marking unit 21 as constituted, for example, by the markers 21d, 21f, 21t which are associated mechanically with the printing unit 3 and which produce respectively the marks $M_d$, $M_f$, $M_t$.

In a second method (shown in FIG. 4), the marking operation proper takes place after completion of the printing of the tube circuit A by means of an independent marking device.

Accordingly, the printing unit 3 advantageously deposits an intermediate mark $M_i$ which is located in a predetermined position relative to the tube circuit A. The mark $M_i$ is preferably applied with the same ink as the tube circuit A.

The marking unit 21 proper is mounted downstream of the printing unit and comprises the markers 21d, 21f, 21t. This device is controlled by a detector 22 for the intermediate mark $M_1$ by virtue of the follow-up system 23. In this case, the mark $M_1$ carries out with a certain relative displacement in time the marking operation proper which is always performed in strict geometrical correlation with the position of the tube circuit A.

The first method aforesaid has the advantage of great mechanical simplicity for obtaining marks in correlation with the pattern or outlay of the tube circuit A.

However, this method requires that the borders 2a, 2b should have a sufficient width on each side of the tube circuit A. In point of fact, the printing unit 3 projects both longitudinally and laterally with respect to the tube circuit A and the markers 21d, 21f, 21t must in turn be placed after the unit 3. Under these conditions, if the tube circuit A is intended to come close to the edges of the panel, strips 1, 2 of sufficient width must therefore be employed, said strips being subsequently cut lengthwise to the required width, which results in wastage of material.

The second method aforesaid in which the marking is performed at a later stage relative to the printing operation makes it possible to overcome this disadvantage since the marking unit 21 is not hindered by the printing unit 3.

The transfer of the composite strip 10 through the rolling mill 7 produces a substantial elongation of this latter which may be of the order of 2.5 to 5, for example. The detection unit 15 and the follow-up system 16 are controlled by the marks $M_d$, $M_f$ of the strip 10 and control the rolling pressure of the mill 7 in order that, after the rolling process, the elongation of the tube circuit A should result in the standard length $L_o$ which is established for this tube circuit.

If L designates the actual length of the tube circuit A after rolling which corresponds to the distance between the marks $M_d$, $M_f$, and $L_o$ serves to designate the ideal length to be maintained between marks, the units 15 and 16 are so arranged as to measure L, to compare this value with the value $L_o$ and to utilize the difference $(L-L_o)$ as an error signal which permits of control both in magnitude and in direction of the screw-down rig 8.

If the marks $M_d$ and $M_f$ do not correspond to the beginning and end of the tube circuit, the value $L_o$ corresponds to a predetermined multiple of the distance D which has previously been defined.

The detection unit 15 of the rolling mill 7, comprises one or a plurality of detectors. The design of these detectors is suited to the type of mark M according to the table of correspondence give above; the number and position of the detectors are suited to the number and position of the marks M.

In particular, in the case of marking as contemplated in the case of the tube circuit $A_2$, the detection unit comprises two detectors 15d, 15f (as shown in FIG. 5) which are respectively located on the tracks $m_d$, $m_f$.

The follow-up system 16 additionally comprises a measuring device 25 which serves to measure the length of the strip 10 in continuous motion and controls a measuring transducer such as a pulse generator which delivers a digital signal which is proportional to the length L of the strip being measured. In other words, the measuring device 25 is a digital-to-analog measurement converter.

The measuring device 25 is connected to a counter 26 which is put into operation by the detector 15d by virtue of the relay 27d and which is stopped by a relay 27f controlled by the detector 15f. The counter 26 forms part of a computer 30 which determines the value of the length L by counting the number N of pulses delivered by the measuring device 25 between an instant of commencement of the counting operation which is indicated by the pulse delivered by the relay 27d and an instant of completion of counting which is indicated by the pulse delivered by the relay 27f. The number N of pulses as thus counted is proportional to L. Said number is compared by the computer 30 with number $N_o$ corresponding to the length $L_o$ and the error signal $N-N_o$ which is obtained as considered in both magnitude and sign is converted in the computer 30 by analog or digital computation by means of a correlation function into direction and amplitude control signals (tightening of rolls or slackening-off) which are transmitted by the computer 30 to the screw-down unit 8.

The slowness of variations in elongation of the strips which are wound off in continuous operation and the very low rates of thermal deformation of the rolling mill in relation to the rate of transfer of the successive tube circuits usually make it possible to obtain sufficiently small variations in the elongations which result from this "subsequent" control of distances between marks.

In FIG. 5, a comparator 28 is also shown diagrammatically within the computer unit 30 and is intended to receive from a display unit 29 a signal corresponding to the reference length $L_o$. The comparator 28 delivers a signal which is proportional to $L-L_o$ and, by way of a follow-up control chain which it not shown in the drawings, controls the screw-down unit 8 of the rolling mill 7 both in magnitude and in direction.

Under these conditions, it is apparent that, when the mark $M_d$ is detected by the detector 15d, the counter 26 is released through the relay 27d and counts the number of pulses received from the measuring device 25. When the counter 26 is stopped by the relay 27f as a result of the detection of the mark $M_f$ by the detector 15f, the comparator 28 compares the representative value of L which is recorded in the counter 26 and the representative value of $L_o$ which is supplied by the stage 29. If these two values are unequal, the comparator 28 actuates the screw-down rig 8 in the requisite direction in order that the difference $L-L_o$ should tend towards zero.

Provision is also preferably made in accordance with the invention for automatic control of the differential rolling pressure of the mill 7 by virtue of a determination of the difference in alignment between the marks $M_d$ and $M_t$ which are located in the vicinity of the two opposite edges of the strip.

To this end, profision is made above the track $m_t$ of the marks $M_t$ for another detector 15t which drives a time-base comparator 32 via a relay 31t, said comparator being driven in parallel via the relay 27d. The comparator 32 in turn controls differentially both in magnitude and in sign by means of servomechanisms 33a, 33b the screw-down rigs which belong respectively to each stand of the rolling mill 7.

The rolling pressure is thus controlled differentially in the requisite direction so that the marks $M_d$ and $M_t$ which are intended to be brought into alignment tend to be simultaneously detected by the detectors 15d, 15t.

In the case in which the marking is effected as described in connection with the tube circuit $A_1$, provision is made for a single detector 15$d^f$ on the track $m$ and said detector controls a bistable device 35 which serves to discriminate between the marks $M_d$, $M_f$. The bistable device 35 controls as in the previous embodiment the relays 27d and 27f which serve to release and stop the counter 26.

The remainder of the operation is the same as in the previous embodiment.

As is readily understood, the follow-up system can be adapted without difficulty to the case in which the marking is effected in accordance with the tube circuit $A_3$ of FIG. 2 or in the case in which the detectors 15d and 15f are not located on a same transverse line.

The means provided for the automatic control of the top blade 12 of the shearing machine 9 comprise, in the case in which the frame of this machine is assumed to be stationary, a continuous-motion detector 17 $d_1$ which is located vertically above the track $m_d$ and which is adapted to control by means of a relay 37 the device 38 for initiating the low-speed operation of the driving roll 39 which feeds the strip 10, the motor unit being shown diagrammatically at 41. Means (not shown in the drawings) permit the formation of a loop at the upstream end on the strip 10 in the event of low-speed operation. Inasmuch as the time of reaction between the detection pulse and effective stoppage of the driving roll is not negligible but substantially constant, the feed motion at a known low speed permits the transfer of a known length $d$ of strip between the moment of transmission of the stopping order by the detector 17 $d_2$ and the actual moment of stopping.

There is placed in contact with the strip 10 a transfer rate measuring device 42 which emits pulses, the number of said pulses being proportional to the length of strip 10 which passes beneath said device. The measuring device 42 feeds a counter 43 which is connected to a comparator 44. Said comparator is in turn connected to a display unit 45 which serves to store in a memory device a predetermined length C of transfer of the strip. The counter 43 is released by means of a relay 46 which is controlled by a cutting detector 17 $d_2$ which is placed downstream of the detector 17 $d_1$ vertically above the track $m_d$.

The comparator 44 controls at the same time with suitable time constants the device which locks the driving roll 39 and the device 11 which actuates the shearing machine 9.

If D designates the distance which exists between the top shear blade 12 and the cutting detector 17 $d_2$, if $d$ serves to designate the known length of strip which is transferred after actuation of the locking device 47, and if E designates the distance between the mark $M_d$ and the line corresponding to the cut to be made, the length C which is introduced in the display unit 45 is such that:

$$C = D - (d + E)$$

The operation is as follows: when the strip 10 is moving at high speed in the direction of the arrow F, and when the motion detector 17 $d_1$ is excited by the mark $M_d$, said detector initiates the change-over to slow running by means of the device 38. This permits of accurate detection of the mark $M_d$ by the cutting detector 17 $d_2$. When this detection has taken place, the length of strip transferred is measured by the measuring device 42. When this length is equal to C, the comparator 44 is released and initiates the locking of the driving roll 39 followed by the downward motion of the shear blade 12 which thus cuts the strip at the distance E from the head mark $M_d$.

It can clearly be seen from the foregoing that, by virtue of the means provided, the marking operation permits of full automation of production of intermediate panels 14, this automation being realized with precision.

As is also readily apparent, it would not constitute a departure from the scope of the invention to carry out the detection either upstream or downstream of the shearing machine in order to make use of a mark which would be placed near the end of the tube circuit. However, it is always an advantage to make use of a mark which is placed near the cutting zone in order to prevent any dimensional variations arising from slight variations in elongation and from errors of the measuring device.

There will now be described a more detailed industrial embodiment of the invention, reference being made to FIGS. 6 to 21, in which elements having the same functions are designated by the same reference numerals as in FIGS. 1 to 5.

The strips 1 and 2 are wound off continuously in the direction F from two supply reels 53, 54 which are removably mounted on supports 50.

As they are delivered from the reels 53 and 54, the strips 1 and 2 are subjected to the action of facing roll trains 55, 56 for the purpose of truing the strips and consisting of a succession of rolls disposed in alternate sequence. The strips 1 and 2 then pass into compartments 57, 58 in order to undergo a surface preparation process.

Inside said compartments, the oppositely-facing surfaces of the strips are treated in known manner in order to permit of subsequent uniform contact between said two surfaces at the moment when they are pressed against each other in the rolling operation, thereby producing a weld as a result of a mutual binding process.

In the simplest case which corresponds to the example shown in FIG. 6, the surface preparation is reduced to a brushing operation carried out by means of rotary brushes 59, 60 driven by units which are not shown in the figure. This brushing operation is particularly suitable when the strips 1, 2 consist of sheet metal. In the case of plastic materials, the brushing operation can be replaced by an abrasion process performed by mechanical or pneumatic shot-blasting or projection of abrasive powders. These known preliminary operations are outside the scope of this invention.

The unit 3 for printing the tube circuit A is disposed on the downstream side of the brush 60.

In the embodiment herein described, the printing unit 3 utilizes the silk-screen printing process and is designed to operate with a relatively rigid strip 2 which progresses in continuous motion. In addition, said printing unit is specially designed to apply an impression in the event that it proves impossible to form with the strip 2 either one or a number of undulations of variable amplitude. When using conventional machines, such undulations make it possible to print the tube circuit in a motionless zone of the strip whilst the upstream and downstream portions of the strip are endowed with continuous movements.

Figure 7:
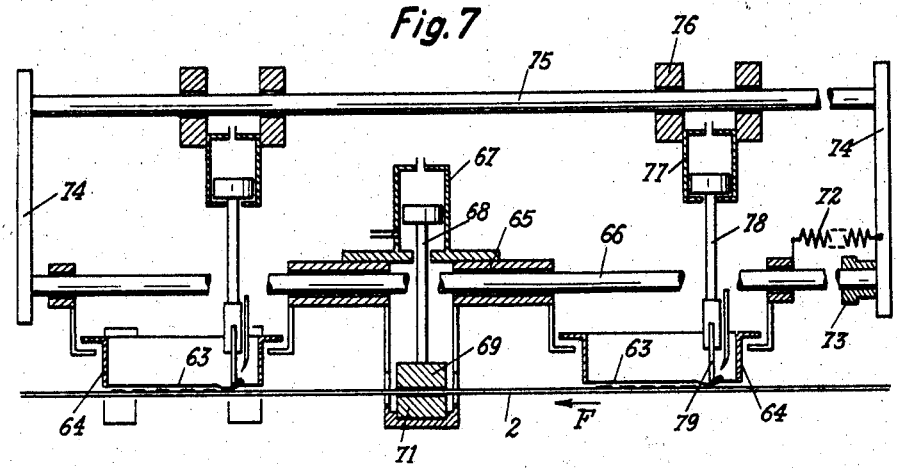
FIG. 7 is a fragmentary view in elevation and in partial longitudinal cross-section showing the device for printing tube circuits.
Figure 10:
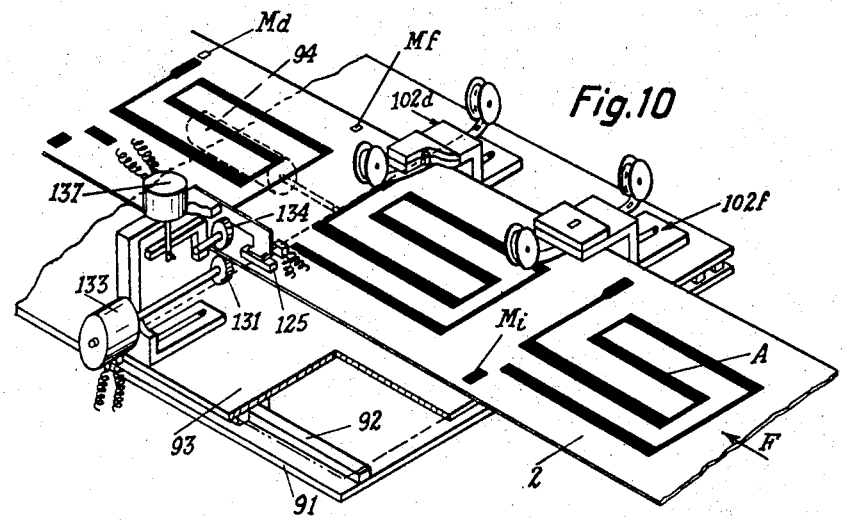
FIG. 10 is a simplified diagram in perspective showing an improved marking device which is designed for use in conjunction with a system for transferring marks.

More specifically, the printing unit 3 comprises (as shown in FIG. 7) two identical frames 64, the base of which is constituted by the silk screen 63 which bears the impression of the tube circuit to be printed. The frames 64 are secured to a sliding support 65 which is guided in translational motion by means of rods 66 which are parallel to the strip 2 and supported by a stationary cross-frame 74. The sliding support 65 comprises a jack 67, the sliding operating rod 68 of which is fitted with a movable clamping jaw 69 disposed above the strip 2. The jaw 69 is adapted to cooperate with a jaw 71 which is stationary with respect to the vertical and rigidly fixed to the support 65. A restoring device which is represented diagrammatically by a spring 72 and which could also be constituted by a jack tends to bring the support 65 back to a fixed starting position in which it is applied against a stop 73 of the stationary cross-frame 74 which is also adapted to carry parallel rods 75 and these latter serve as supports for positionally adjustable cross-members 76. Said cross-members 76 are adapted to carry jacks 77, the sliding operating rods 78 of which are each adapted to carry at the lower end thereof a flexible scraper 79 which is fitted in one of the frames 64 and which is in resilient contact with the correspnoding printing screen 63. Devices which have not been shown in the figure serve to feed the ink into the frames 64. The pitch between two consecutive frames 64 corresponds substantially to three times the overall length of a tube circuit A as measured in the direction F.

The operation is as follows: when the support 65 bears against the stop 73, and if the operating rod 68 of the jack 67 is displaced downwards, the jaw 69 accordingly applies the strip 2 against the jaw 71, thereby interlocking the support 65 and the strip 2 and initiating the displacement of the printing frames 64 in the direction of the arrow F. At the same time, the operating rods 78 of the jacks 77 are moved downwards, so that the scrapers 79 are thus applied against the screens 63. Since the printing frames 64 are transferred together with the strip 2 and the scrapers 79 are stationary, the screens 63 are swept as a result of relative motion with respect to said scrapers and two tube circuits A are printed simultaneously.

When the impression has been applied, the operating rods 68 and 78 are moved upwards, the support 65 is brought back to its initial position by the spring 72. FIG. 8 shows the result of the printing operation, or the impression which is constituted by two printed circuits A having a relative spacing of three pitches.

Figure 9:
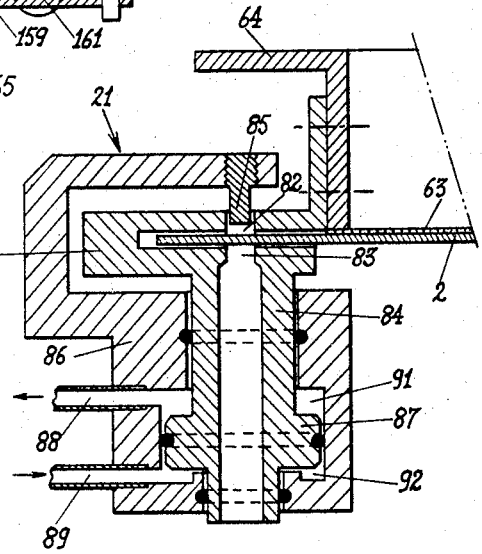
FIG. 9 is a view in cross-section on a larger scale showing a punch-type marker.
Figure 11:
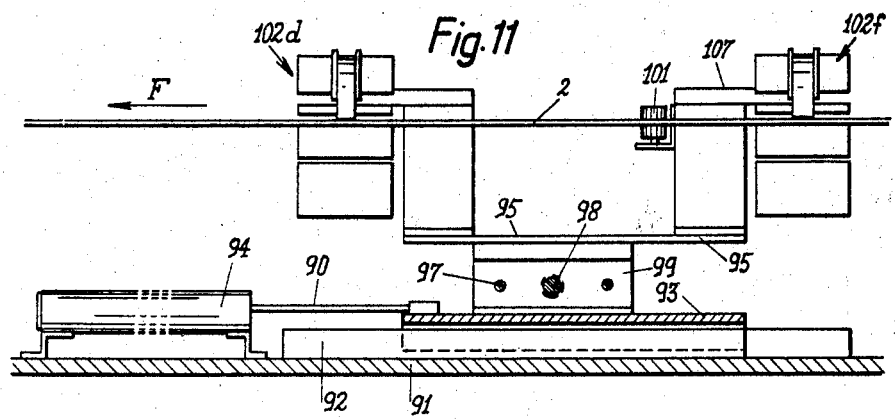
FIG. 11 is the corresponding view in elevation and in cross-section taken along the line XI—XI of FIG. 12.
Figure 12:
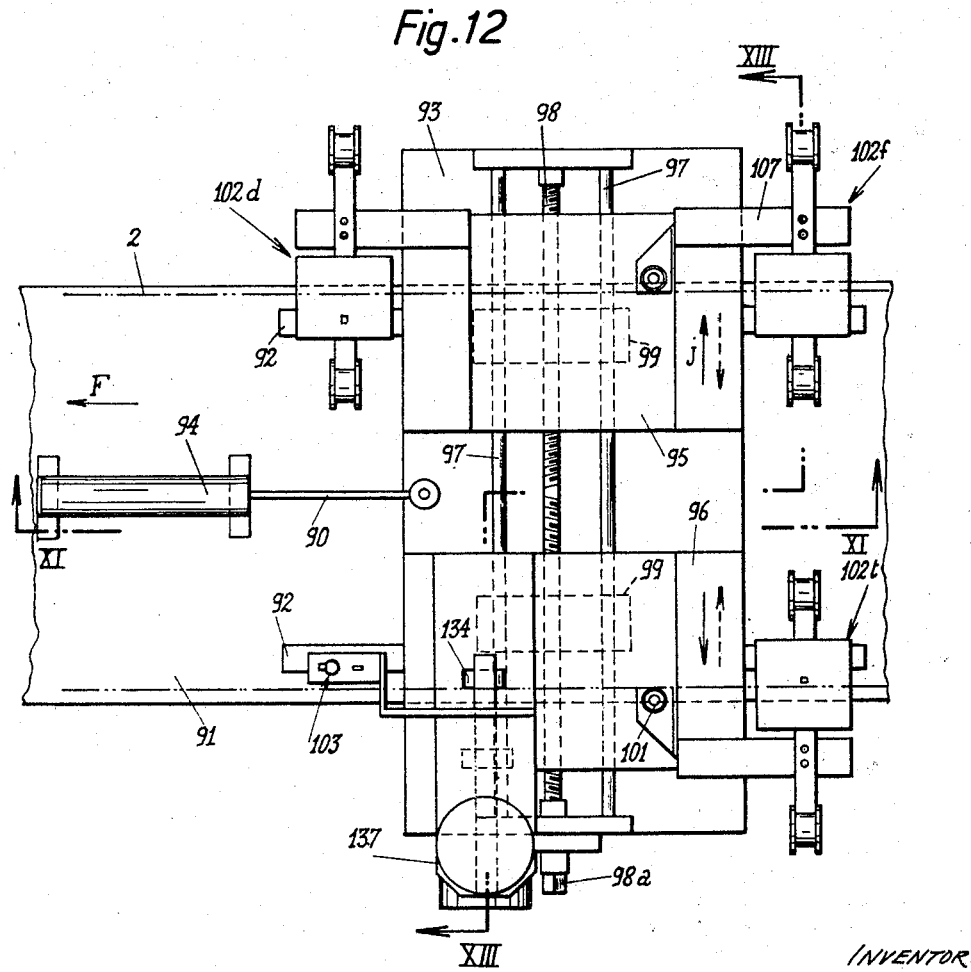
FIG. 12 is the plan view of the marking device.

If the marking is carried out by punching of the strip 2 and it is desired to perform this operation at the same time as the printing of the tube circuits A, a device is employed as described in FIG. 3, wherein the markers 21 which are employed for the purpose of forming the marks $M_d$, $M_f$ and possibly $M_t$ are preferably each designed in accordance with FIG. 9. It is apparent from this figure that the printing frame 64 carries laterally a die 81 which surrounds the edge of the strip 2 and which is pierced by two oppositely facing holes 82, 83. Said holes may, for example, be of rectangular shape and the hole 83 is formed in a sleeve 84 which is located beneath the strip 2.

The marker 21 comprises in addition a punch 85 which is located in the center-line of the holes 82, 83. The punch 85 is carried by a cylindrical body 86 which is slidably mounted on the sleeve 84.

The punch 85 is actuated hydraulically by a double-acting jack, the moving body of which is constituted by the part 86 which surrounds a stationary piston consisting of a ring 87 which is formed on the sleeve 84. Two pipes 88, 89 serve to admit compressed air into chambers 91, 92 which are disposed within the body 86 on each side of the piston 87, leak-tightness being ensured by means of inset O-ring seals.

When the marker 21 is in the position shown in FIG. 9, the admission of compressed air into the chamber 92 after the operating rod 68 of the jack 67 has been moved downwards causes the punch 85 to pass through the holes 82, 83 and produces the correlative cutting of a mark. Waste metal is discharged through the internal passageway of the sleeve 84.

In order to benefit by the advantages which are inherent in the delayed marking of the strip (full utilization of the surface of the strip 2 for the purpose of printing tube circuits A and possibility of making use of any type of printing machine such as, for example, a machine of the type comprising a rotary printing cylinder), provision is made by the invention for the use of a marking device of the type shown in FIGS. 10 to 15 which corresponds to a particular industrial application of the arrangement shown in FIG. 4. Said device is more especially suited to the case in which the final marks are constituted by pellets of magnetic metal which are inserted in the strip 2, said strip being assumed to be formed of non-magnetic material.

The aforesaid marking device essentially comprises a stationary frame 91 above which the strip 2 is intended to progress. The frame 91 carries rails 92 which are parallel to the direction F of progression of the strip, thereby permitting the sliding motion of a table 93 which is returned to its initial position by means of a jack 94 which rests on the frame 91, the sliding operating rod 90 of said jack 94 being attached to the table 93.

There are slidably mounted on the table 93 two carriages 95, 96 which are guided in translational motion by means of parallel rods 97 placed at right angles to the direction F. The simultaneous application of motion to the carriages 95, 96 is carried out by means of a threaded rod 98 having opposite screw threads which are screwed into a sliding support bracket 99 which is traversed by the rods 97 and which is mounted beneath each table 95, 96. The rod 98 is driven in rotation at one extremity 98a and permits the displacement of the carriages 95, 96 in the opposite direction $j$ in order to adapt the position of said carriages to the width of the strip 2. To this end, said carriages carry guide rollers 101 which are intended to come into contact with the edges of the strip 2.

The carriage 95 is adapted to carry two devices 102d, 102f for insetting a pellet of magnetic metal which is intended to constitute respectively the marks $M_d$ and $M_f$. The carriage 96 is adapted to carry an insetting device 102t for the mark $M_t$ and on the other side a detector 103 which is located above the path of the printed marks $M_t$. The detector 103 is coupled (as shown in FIG. 14) to a follow-up unit 104 which controls at the same time the pellet-insetting devices 102d, 102f, 102t and a system 105 for taking up play at low speed.

Figure 15:
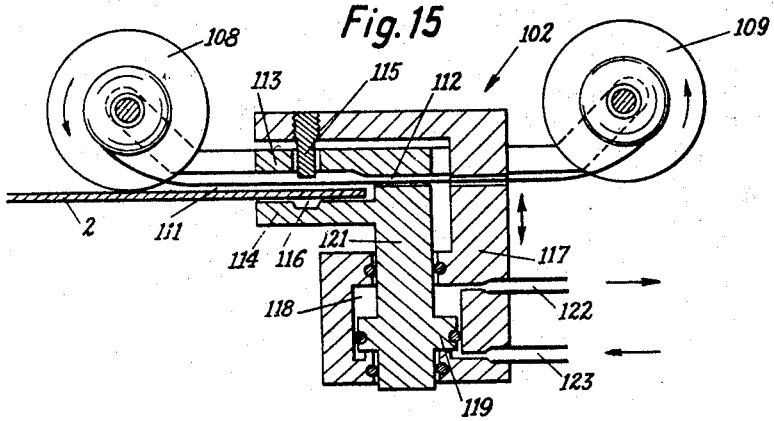
FIG. 15 is a view in transverse cross-section showing the corresponding marker.

Each insetting device which is generally designated by the reference numeral 102 comprises (as shown in FIG. 15) a structure which is derived from that which is provided for the markers 21 of FIG. 9. More precisely, the carriage 95 or 96 carries a lateral arm 107 on which are mounted two reels, one reel being a supply reel 108 and the other being a receiving reel 109 for a metallic ribbon 111 which is wound on said reels and which can run off in step-by-step progression above the strip 3 and transversely with respect to this latter, said ribbon being intended to pass across the paths of the marks $M_d$, $M_f$ and $M_t$. The unwound portion of the ribbon 111 is guided through a slit 112 of a die comprising two arms 113, 114 which are placed on each side of the strip 2. The arm 113 is traversed by a moving punch 115 which is located directly above the path of the marks and the arm 114 has a cup-shaped portion 116 located in oppositely-facing relation to said punch. The punch 115 is actuated by a double-acting jack having a moving body 117. Said body comprises a cylindrical chamber 118 surrounding a piston 119 which is integral with a rod 121 carried the insetting die. Air ducts 122, 123 ensure the supply of compressed air to two annular volumes which are defined within the chamber 118 by the piston 119. The ducts 122, 123 terminate in the follow-up control units 104 which comprise a set of relays and electrovalves for the passage of the compressed air.

Additional means of the electromechanical type, for example, (not shown in the drawings) produce the non-continuous delivery of the metallic ribbon 111 between the reels 108, 109. These means are also controlled by the unit 104.

In the embodiment considered, the detector 103 comprises a casing 125 which is rigidly fixed to the carriage 96. Said casing contains a light source 126 which shines on the strip 2 through a slot 127. The light beam is reflected from the strip 2 to a detection photoelectric cell 128 which is also directed towards the slot 127. The cell 128 is connected to the control unit 104.

Figure 13:
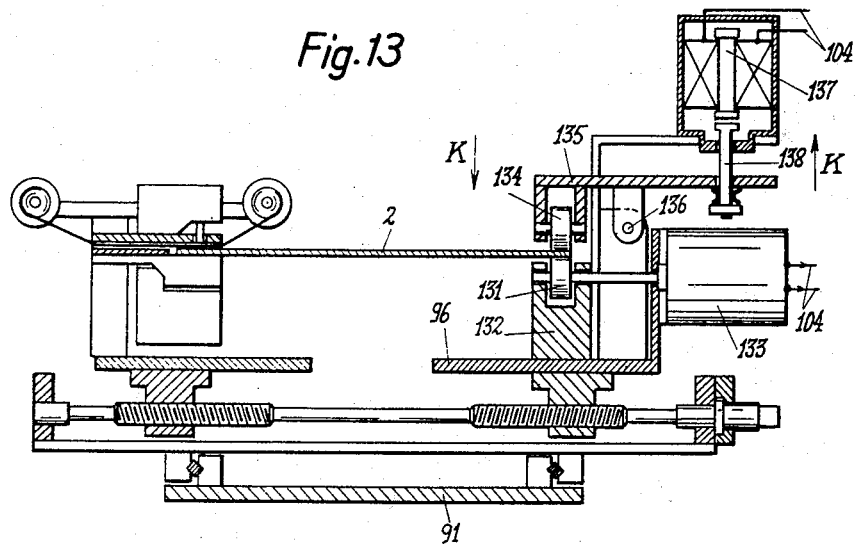
FIG. 13 is a view in cross-section taken along the line XIII—XIII of FIG. 12.

The system 105 for taking up play comprises (as shown in FIGS. 13 and 14) a small wheel 131 having a non-skid surface and mounted in a yoke 132 which is fixed on the carriage 96. The small wheel 131 is driven by a motor 133 and, on the side opposite to the small wheel 131 relative to the strip 2, there is mounted a counter-wheel 134 which is mounted to rotate freely and carried by an arm 125, said arm being pivotally mounted on a pin 136 and connected by means of this latter to the carriage 96. The arm 135 is driven in its movement of angular displacement by means of an electromagnet 137 which is capable of attracting a magnetic core 138, this latter being flexibly mounted on the arm 135. Both the motor 133 and the electromagnet 137 are coupled to the follow-up control unit 104.

The operation is as follows: the strip 2 progresses freely between the small wheels 131 and 134. The table 93 is located at the rear end of travel with respect to the direction F.

When a mark $M_1$ comes opposite to the slot 127 of the detector 103, the photoelectric cell 128 is subjected to a variation in illumination which is transmitted to the followup control unit 104. Said unit then initiates the excitation of the electromagnet 137 which attracts he core 138 and causes the arm 135 to pivot in the direction K (FIG. 13), thereby clamping the strip 2 between the wheels 131 and 134. At the same time, the motor 133 is started up and causes the active wheel 131 to rotate at a low linear rate of the order of one millimeter per second, for example. As a result of this action, the moving system constituted by the complete assembly of carriages 95, 96 and table 93 moves forward in turn in the direction of the arrow F at an absolute speed which is slightly higher than that of the strip 2 and at a relative speed with respect to the strip 2 of the order of one millimeter per second. Under these conditions, the detector 103 reaches the mark $M_1$ and when the front edge of this latter comes in front of the window 127, the photoelectric cell 128 which is once again excited initiates through the intermediary of the follow-up control unit 104 the stoppage of the motor 133 and the actuation of the insetting device 102. This actuation is obtained by directing compressed air through the duct 123, thereby resulting in the downward motion of each punch 115 which cuts through the metallic ribbon 111 by die-stamping and embeds it in the strip 2 which takes the shape of the cup 116. The unit 104 then initiates the release of the markers and of the small wheel 134 followed by the return of the table 93 to its initial position under the action of the jack rod 90.

It is apparent that the compensation movement which is thus provided for the table 93 and its ancillaries makes it possible to enhance the accuracy of positioning of both carriages 95, 96 with respect to the mark $M_1$. In fact, the variation in illumination is not instantaneous and the response times of the electromechanical devices are not negligible with respect to the rate of progression which is usually several centimeters per second and is subject to variation during manufacture. This would give rise to variable differences between the position of the tube circuit A and the position of the marks if it were considered sufficient to lock the carriages 95, 96 on the strip 2 directly by means of fixed jaws. It is therefore possible by starting up the motor 133 to secure the moving carriages and the strip at the moment when the edge of the mark $M_1$ reappears in front of the window 127, the transition being always effected at a very low constant speed, thereby ensuring a constant correlation between the positions of the tube circuit and the marks.

The metallic ribbon 1 which was maintained at a distance from the strip 2 in order to permit the above-mentioned marking operations is then brought into contact with said strip by means of deviation rollers 141, 142, the strip 2 itself being supported by rollers such as the roller 143.

The two juxtaposed strips 1, 2 then pass through the heating enclosure 4 in which they are heated to a temperature comprised, for example, between 350 and 450° C. in the case of aluminum alloys. This heating operation is primarily intended to subject the sheets to the requisite conditions of temperature in order to ensure their juncture at the time of rolling, it being understood that the strips could also be cold-rolled provided that the reduction ratio at the time of rolling is increased.

Figure 16:
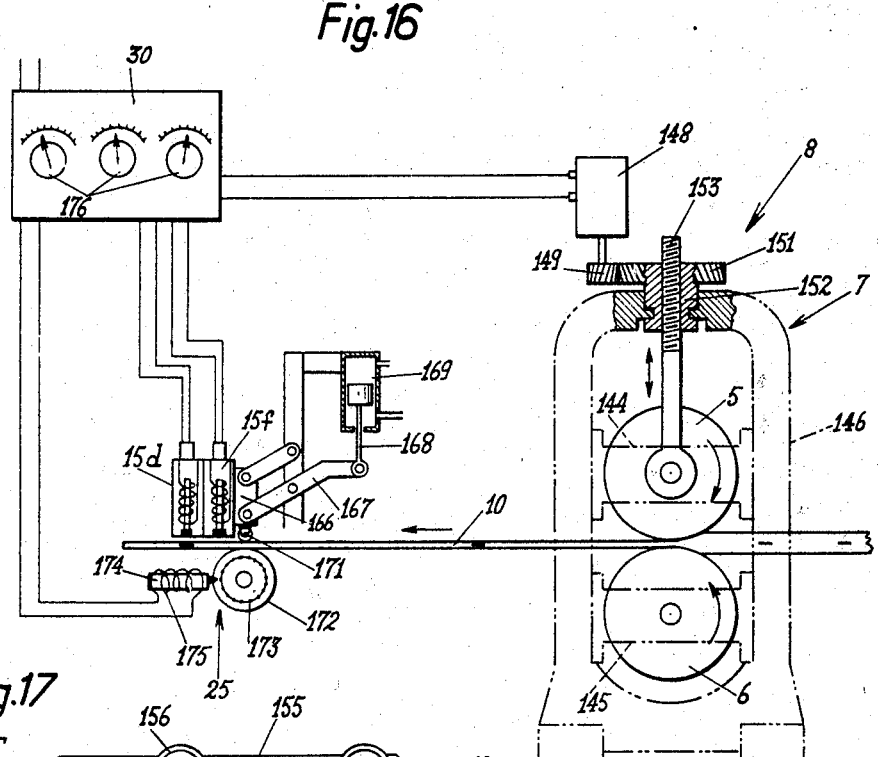
FIG. 16 is a view in side elevation of the rolling mill and of the mark detector of the electromagnetic type.

The strips 1 and 2 then pass between the rolls 5 and 6 of the rolling mill 7, the journals of which are carried by lateral bearings, namely sliding bearings 144 and fixed bearings 145, which are mounted in stands or housings 146 (as shown in FIG. 16). The bearings 144 are positionally controlled by the adjustable clamping mechanism or screw-down rig 8 which comprises two reduction gear motors 148. Each motor drives a pinion 149 which is disposed in meshing engagement with a second pinion 151 keyed to a rotary nut 152, said nut being mounted in the housing 146 and traversed by a threaded rod which is attached to the movable bearing 144.

It is clear that the rotation of the motors 148 produces the rotation of the nuts 152, thereby ensuring the translational motion of the bearings 144 in the direction either of tightening or slackening of the rolls. If the nuts 152 rotate through a same angle, the total roll pressure is modified. If said nuts rotate through different angles, the roll pressure is modified differentially from one side to the other.

Figure 17:
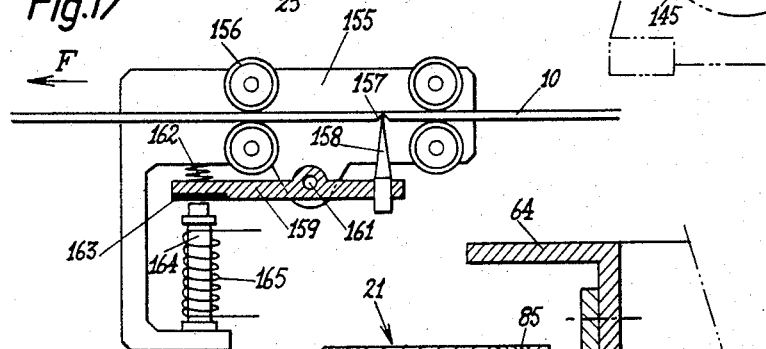
FIG. 17 is a view on a larger scale showing a mark detector of the feeler type.

The detectors 15$d$, 15$f$, 15$t$ which are located downstream of the rolling mill 7 as shown in FIGS. 1 and 5 are suited to the type of marking adopted, as has been explained earlier. In the case in which the marking is carried out by punching with markers of the type described in FIG. 9, the detector is preferably as shown in FIG. 17. This detector comprises a carriage 155 which is stationarily mounted but adjustable and provided with runner-wheels 156 between which the strip 2 is intended to pass. Said strip 2 carries the punching mark M consisting of a small depression 157 having a depth which has been substantially reduced during the rolling operation. The carriage 155 carries an electromechanical detector which comprises a feeler 158 located vertically opposite to the path of the depressions 157. The feeler 158 is tapered to a point and is carried by a rocker-arm 159 which is pivotally mounted on a pin 161 and acted upon by a spring 162 in such a manner that the feeler 158 should rub against the underface of the composite strip 10. The arm 159 is fitted with a ferro-magnetic plate 163 placed opposite to the end of a magnetic core 164 around which is placed a winding 165, the complete assembly being carried by the carriage 155.

It is apparent that, at the moment of transition of a mark M, the feeler 158 penetrates into the depression 157, thereby moving the plate 163 towards the core 164. The rapid variation of the air-gap between these two components generates an electromotive force and the signal thus produced is then amplified by known electronic means.

In the case in which the marks M consist of inserted pellets of ferro-magnetic metal, the detectors 15 advantageously consist of proximity detectors of known type which are shown diagrammatically in FIG. 16. Each detector comprises a head constituted by four coils mounted as a bridge in pairs on two adjacent and parallel ferromagnetic cores housed in a casing. The circuit is connected to an amplifier which comprises a bistable device. As the pellet of ferro-magnetic metal which is inserted in the strip 10 moves towards one of the cores, the bridge becomes unbalanced and results in the appearance of a voltage at the terminals of this latter. Said voltage is amplified, then rectified and applied to the bistable device. As soon as the rectified voltage reaches the trip threshold, a relay is energized and moves into the working position. The withdrawal of the pellet restores the relay to the rest position.

FIG. 16 shows two detectors 15$d$, 15$f$ which are placed side by side and carried by a block 166 which is coupled by means of link-arms 167 to the sliding rod 168 of a fixed control jack 169. The block 166 carries a roller 171 located above the strip 10 and located vertically above a non-skid wheel 172 which is placed in contact with the underface of the strip 10. The wheel 172 carries a toothed wheel 173 of magnetic metal which rotates in front of the extremity of a pick-up consisting of a magnetic core 174 which is surrounded by a winding 175 and the tapered end of which is located at a short distance from the teeth of the wheel 173. The combined assembly of these components constitutes the measurement device of FIG. 5.

When in service, the jack 168 is put under pressure and applies the runner-wheel 171 against the strip 10 which is thus clamped between this latter and the wheel 172. The detectors 15$d$ and 15$f$ are placed in the immediate proximity of the strip 10 and each delivers an electric pulse when the marks $M_d$, $M_f$ pass directly beneath.

The detectors 15$d$, 15$f$ and 15$t$ if necessary as well as the winding 174 of the measurement device 25 are connected to the computer 30 on which pointer knobs 176 forming part of stage 29 of FIG. 5 are shown diagrammatically. Said knobs serve to indicate the value of $L_o$ in meters, centimeters and millimeters.

A rolling mill comprising two roll-clamping motors 148 which are driven in parallel from the computer 30 can advantageously be employed when the device according to the invention only makes use of the marks $M_d$, $M_f$ for the purpose of controlling the total roll pressure of the mill.

Figure 18:
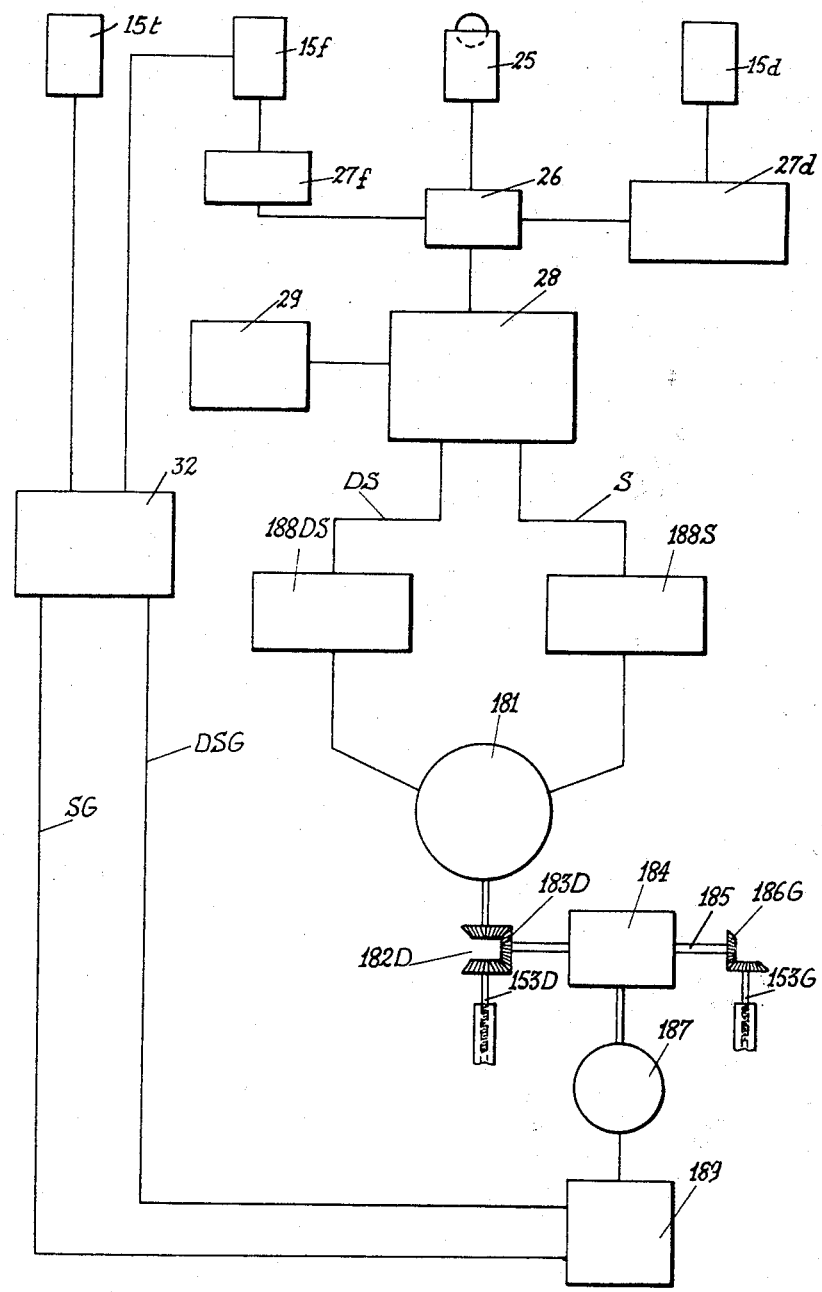
FIG. 18 is a logic circuit diagram of the electronic control system of the rolling mill.

However, should it prove desirable in addition to regulate by means of the marks $M_t$ the differential pressure applied by the rolls of each stand of the mill 7 in order to prevent any defective squaring of the tube circuits, it is preferable to provide, as shown in FIG. 18, a single clamping motor 181 which drives the right-hand clamping screw 153D by means of an intermediate pinion 183D. The pinion 183D of the double bevel-gear drive unit 182D is coupled to the input shaft of a mechanical differential drive unit 184, the output shaft 185 of which drives a bevel-gear system 186G, thereby operating the left-hand clamping screw 153G. The second input of the differential drive unit 184 is controlled by a differential clamping motor 187.

The supply of current to the motor 181 which controls the tightening or slackening of the rolls is effected from the comparator 28 in parallel via two channels: the channel S which is assigned to the roll-clamping or tightening comprises a general roll-tightening device 188S which ensures the rotation of the motor 181 in the direction corresponding to increased roll pressure.

The channel DS is coupled in parallel to a device 188DS which permits the rotation of the motor 181 in the direction corresponding to general slackening of the rolls or reduced roll pressure.

In addition, the motor 187 is supplied with current from the comparator 32 via two channels, namely a channel SG which corresponds to left-hand tightening and a channel DSG which corresponds to left-hand slackening. These two channels control in parallel a device 189 which drives the motor 187 and this latter initiates, for example, the movement of rotation of the cage of the differential drive unit 184.

The control units 188S, 188DS, and 189 have a preadjustable amplitude of movement.

It is understood that, under these conditions, if the difference $L-L_o$ which is detected by the comparator 28 is negative, a sub-length signal is delivered into channel S and initiates via the control unit 188S the rotation of the motor in the roll-tightening direction. Conversely, if the difference $L-L_o$ is positive, an over-length signal is delivered into channel DS and causes the motor 181 to rotate in the roll-slackening direction. As indicated earlier, this correction signal is a function of the difference which is found.

At the same time, if the mark $M_t$ which is located, for example, on the left-hand side is located in a retarded position with respect to the mark $M_f$ with which it should be in alignment, the comparator 32 of the displacement of reception of transverse marks (which comprises a trip threshold) delivers a signal into channel SG and the motor 187 produces the left-hand tightening of the rolling mill. Conversely, if the mark $M_t$ is in advance, the order is directed to channel DSG and the roll pressure is reduced on the left-hand side. Thus, the alignment of the marks $M_t$ and $M_f$ can be regulated with high precision and in a wholly automatic manner. This prevents any warping of plates and any distortion of the printed tube circuits, which is a particularly noteworthy feature.

In an alternative form which is not shown in the drawings, the data relating to elongation which are measured by the computer 30 serve to control a second rolling mill which is placed downstream of the detectors 15 and in which the variation in roll pressure makes it possible to adjust individually the complementary elongation to be given to each of the tube circuits in order to correct the inadequate roll pressure of the first rolling mill which, in this case, is not servo-controlled.

The composite strip 10 is then conveyed into an annealing furnase 191 (as shown in FIG. 6) in which the temperature of the sheets is brought for a period of a few minutes, for example, from the value of 180° C. reached at the end of the rolling process to a value within the range of 450 to 525° C. in the case of aluminum.

In point of fact, the surfaces of the strips 1, 2 undergo substantial strain-hardening as a result of the rolling process and this would not be favorable to the subsequent formation of the tube circuits A by expansion owing to the hardness of the metal.

The arrangement of the annealing furnace 191 immediately downstream of the rolling mill 7 makes it possible to derive benefit from the heating produced in the rolling operation and thus limits the quantity of heat to be supplied in order to attain the annealing temperature.

Provision is made beyond the furnace 191 for a cooling system 192 consisting of an assembly of spraying racks which are followed by a set of feed rollers 193 driven from a motor 194 by a belt 195.

There is mounted downstream of the rollers 193 a trueing and conveying train 196. Between the rollers 193 and 196, there is formed a free zone U (as shown in FIGS. 19 and 20) in which, as the strip 10 is moved forward continuously at the rolling speed by the roller-train 193, there can be formed an undulation 10a (as shown in FIG. 20) during the stages of slowing-down of the rollers 196 and of stopping of these latter at the moment of shearing as will become apparent later.

The shearing machine 9 is placed downstream of the roller-train 196, and it can be seen that the bottom shear blade or counter-blade 13 is supported on a fixed table 197 over which the strip 10 passes.

The top shear blade or moving blade 12 is actuated by means of a crank and link-rod assembly 11, this latter being driven by means which are not shown in the figure.

Application of motion to the roller-train 196 is effected respectively at high speed by a motor 198 and at low speed by a braking motor 199, these two motors being adapted to drive two sprockets 200, 201 respectively which can be brought into engagement selectively by means of a reversing clutch unit 210 with a secondary sprocket 202. By means of a driving chain 203, the sprocket 202 is adapted to drive a sprocket 204 on the shaft of which is interposed a torque-limiting device 220. By means of this device, the sprocket 204 drives the rollers of the train 193 by means of a driving chain 205.

The driving speed imparted to the train 196 by the motor 198 is sufficiently high to permit of automatic takeup of the loop 10a which is formed between the constant-speed feed-rollers 193 and the variable-speed feed-rollers 196 during the shearing cycle.

In addition, the braking motor 199 conveys the strip 10 at a low speed which can be, for example, of the order of 2 to 5 centimeters per second in order to permit of much more accurate position detection of the mark $M_d$ by the detector $17d_2$. Said detector is shown in FIGS. 19 and 20 as well as the associated detector $17d_1$ which is located upstream. Said detectors are preferably of the proximity detection type described in reference to FIG. 16.

There are shown diagrammatically in FIGS. 19 and 20 the pulse-generating measurement device 42 which comprises in the same manner as the measurement device 25 a wheel 206 which is applied against the strip 10 in non-sliding contact and which is adapted to drive a magnetic sprocket 207, the teeth of which move past a magnetic core 208 surrounded by a winding 209 which delivers pulses as each tooth passes.

Figure 21:
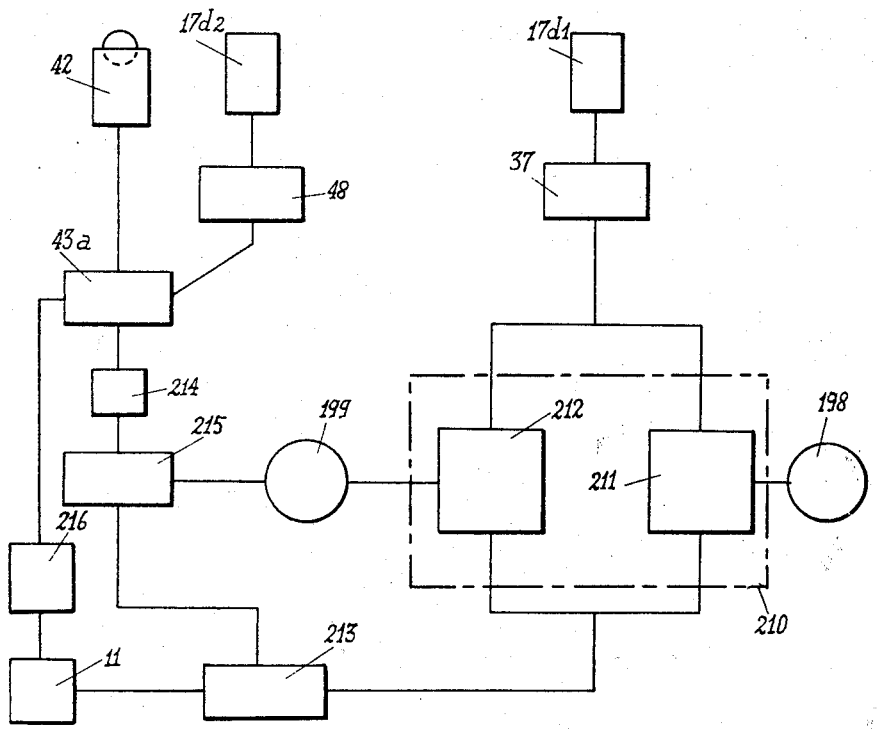
FIG. 21 is a logic circuit diagram of the electronic control system of the shearing machine.

Referring now to FIG. 21 of the accompanying drawings, there can be seen one mode of execution of the system for the automatic control of the shearing machine 9 and of the straightening roller-train 196 which is employed for transferring the strip. This system is generally in accordance with the system described in connection with FIG. 5 but provides for the selective control of the motors 198 and 199.

The motion detector $17d_1$ controls by means of a relay 37 both the disengagement of the motor 198 via the circuit 211 of the clutch unit 210 and, at the same time, the engagement of the braking motor 199 via the circuit 212 of the clutch unit 210, it being recalled that the transfer motor 198 rotates continuously. A time-delay device 213 also produces action on the control circuits 211 and 212 in parallel with the relay 37 but in opposition to this latter; the pulse delivered by the stage 213 produces the engagement of the motor 198 and the disengagement of the motor 199.

The cutting detector $17d_2$ controls via the relay 48 a pulse counter 43a which is coupled to the pulse-generating measurement device 42. The counter 43a is of the preselection and zero resetting type and thus performs the functions of the stages 43, 44, 45 which have been noted earlier. When the number of pulses received by the counter is equal to the preselected number, said counter delivers a command pulse and is reset to zero. The counter $43_a$ is coupled to a relay 214 which in turn controls the relay 215 for supplying current to the braking motor 199. The counter $43_a$ is also adapted to control a time-delay relay 216 which controls the cutting-control device 11 and this latter in turn controls the time-delay device 213.

A shearing cycle is carried out as follows:

When a head mark $M_d$ passes beneath the detector $17d_1$, this latter produces by means of the circuit 211 the disengagement of the transfer motor 198 and by means of the circuit 212 the engagement with the braking motor 199. The strip 10 is then transferred at low speed and the loop 10a will accordingly be formed. When the mark $M_d$ passes beneath the cutting detector $17d_2$, said detector turns on the counter $43_a$ by means of the relay 48 and said counter receives the pulses delivered by the pulse-generating measurement device 42.

When this number of pulses is equal to the number C previously defined, the relay 214 actuates the relay 215 which in turn actuates the brake of the motor 199. The strip 10 is then maintained stationary by the straightening roller-train 196.

At the end of the time interval which is necessary for the stopping of the strip and which is introduced by the time-delay circuit 216, the cutting control device 11 is tripped and the moving shear blade 12 cuts the strip 10 in the exact location required. The time-delay device 213 then de-energizes the relay 215 and the braking motor is released. The device 213 initiates at the same time the disengagement of the braking motor 199 and the motor 198 is re-engaged with the roller-train 196, thereby taking up the loop 10a which was formed from the time of low-speed driving of the roller-train 196.

It would not constitute a departure from the scope of the invention to refer for the shearing operation to a mark which is placed in any desired but predetermined manner with respect to the tube circuit and in particular to a mark which is placed near the end of said tube circuit whilst detectors may, for example, be placed after the shearing machine.

Another alternative arrangement which should not be construed as a departure from the scope of this invention would be to replace the fixed-blade shearing machine 9 by flying shears. As is known, this term designates a shearing machine having a blade which accompanies the product to be cut while in motion. A machine of this type is mounted on guides which are located parallel to the direction of displacement of the product to be cut into sections. Said machine comprises a clamping device which effects the temporary rigid attachment of the machine to the product a short time before starting the cutting operation, then detaches the machine and effects the withdrawal of this latter on completion of the cutting operation. The means described earlier in reference to FIGS. 9 to 14 in connection with the transfer of marks would serve to control a shearing machine of this type by means similar to those just described.

The intermediate panels 14 can be fabricated at a high production rate, with a high degree of precision and in a fully automotive manner.

It is readily apparent that the present invention is not limited to the forms of execution which have been described in the foregoing and that many alternative forms may be contemplated both in the method of marking and in the detection means associated therewith.

There is shown diagrammatically in FIG. 22 an X-ray detector comprising a generator 221 from which the radiation is transmitted through the strip 10 and focused on each side of this latter by two lead rings 222 which define two narrow passageways 223 in alignment with each other and beyond which is disposed a sensitive cell 224 located on the side opposite to the generator 221.

Said detector is suitable if the marks M are constituted by a pellet which is non-transparent to X-rays such as a lead pellet, or else in the case of sufficient transparency of the strip 10 (strip of plastic material) by incorporation of a charge which is sufficiently opaque to the printing ink of the tube circuits A, thereby preventing any deformation of the strip 10.

FIG. 23 illustrates the mode of arrangement of an ultrasonic detector of the type designed for the detection of decohesion phenomena such as lamination or foliation in the sheets. This detector can advantageously be employed in the method of marking by incorporation of a pellet as explained earlier. A detector of this type comprises an ultrasonic frequency generator 225 which excites a quartz crystal 226 carrying a probe 227 which is in contact with the strip 10.

On the opposite side, a second quartz crystal 228 fitted with a probe 229 transmits its oscillations to the receiver 231. It is of course also possible to place the emitter and the detector on the same face of the strip 10 by utilizing the reflection of ultrasonic waves from the zone of discontinuity which is constituted by the mark M.

If the marking is effected with an ink having a radioactive charge which comprises a radioactive element having a short half-life in order to limit the risks of exposure of personnel to radiation, the detection is performed by means of a Geiger counter or a scintillation counter which is placed close to the strip 10.

The foregoing description shows that a large number of modes of execution of the marking process, of the detection operation and of the associated follow-up control systems can be contemplated by the invention without thereby departing from its scope.

In particular, within the definition of a simplified arrangement, the marking could be employed for the purpose of carrying out only automatic cutting-off, whilst the operation of the rolling mill could be controlled by different means. In particular, it would be possible for the control operation just mentioned to employ an apparatus for measuring the thickness of the two rolled strips and comprising, for example, two probes or feelers which are respectively in contact with either one or the other of the faces of the composite strip.

Similarly, the cutting operation performed by the shearing machine could be initiated by the mark corresponding to the end of the tube circuit whilst the detector is suitably placed relative to the shearing machine.

What is claimed is:

1. A process for the automatic and continuous manufacture of intermediate panels comprising integrated tube-circuits by means of two strips delivered continuously and applied against each other by rolling after printing on one of the opposite faces of said strips a tube-circuit pattern formed of a material which prevents adhesion of said faces, wherein the strip on which the tube circuits are printed is provided prior to rolling with a marking which is retained after rolling and which comprises in respect of each tube circuit at least one mark positioned in a predetermined manner with respect to said circuit, in that the position of said mark is detected after rolling but prior to cutting of the strip, and in that said cutting operation is controlled as a function of the length of strip which is delivered after transition of the mark which has thus been detected.

2. A process according to claim 1, wherein the marking comprises two marks in respect of each tube circuit, namely one mark which corresponds to the beginning whilst the second mark corresponds to the end of said tube circuit, and wherein the relative positional difference between the two marks of each tube circuit is measured after rolling and the roll pressure is regulated as a function of the difference thus measured.

3. A process according to claim 1, wherein the marking of the strip is carried out by punching whilst the detection of the mark is performed by means of a mechanical probe system.

4. A process according to claim 1, wherein the marking of the strip is carried out by inserting a pellet having a composition which is different from that of said strip, the detection being performed as a result of a disturbance produced by the pellet on scanning radiation which passes through the strip.

5. A process according to claim 4, wherein the strip is of non-magnetic material, wherein the pellet is of magnetic metal, and wherein the scanning radiation consists of a magnetic or electromagnetic flux.

6. A process according to claim 4, wherein the scanning radiation consists of an X-ray beam.

7. A process according to claim 4, wherein the scanning radiation consists of an ultrasonic wave beam.

8. A process according to claim 1, wherein the marking is carried out by means of an ink containing a charge which is non-transparent to X-rays, the detection being carried out by means of an X-ray beam which passes through the strip at the locations of the marks.

9. A process according to claim 1, wherein the marking is carried out by means of a radioactive ink or pellet, the detection of the mark being carried out by counting the particles emitted by the strip.

10. A process according to claim 1, wherein the marking operation comprises the deposition of an intermediate mark which is printed at the same time as the tube circuit, the subsequent detection of said mark by optical electronic means and the correlated marking of the strip with marks which cannot be erased by subsequent rolling.

11. A process according to claim 1, wherein the marks are disposed on at least one track which is formed along one of the edges of said strip.

12. A process according to claim 1, wherein the marks are disposed along at least one track which is parallel to the edges of the strip but in any region of the width of the strip.

13. A process according to claim 2, wherein the marks corresponding to the beginning and end of each tube circuit are disposed at predetermined distances from the beginning and the end of each circuit.

14. A process according to claim 2, wherein the total roll pressure of the rolling mill is controlled both in magnitude and in direction as a function of the error signal constituted by the difference after the rolling operation between the spacing of the two marks corresponding to the beginning and end of the tube circuit and the standard length which is established for the tube circuit.

15. A process according to claim 11 or claim 12, wherein a transverse mark is disposed opposite to one of the two beginning and end marks in the vicinity of the opposite edge of the strip, and wherein any relative positional difference between the two initially aligned marks is measured after rolling, and wherein the differential pressure applied by the rolling mill is controlled as a function of the difference thus measured.

16. In the fabrication of integral tubular circuit panels by inflating nonbonded zones included between two superposed sheets bonded by laminating along the remainder of their facing surfaces, in which two strips of material are continuously unrolled in facing relation with each other and outlines of the tubular circuit are automatically, regularly and successively printed on that surface of one strip that faces an opposing surface of the other strip, in regularly spaced relation and utilizing a bond-preventing printing substance; the improvement comprising marking a strip adjacent at least one edge thereof at locations coordinated with the circuit outlines imprinted thereon; superposing the strips; surface bonding the superposed strips by laminating under heat and pressure thereby to produce a composite strip in which the distance between successive markings is greater than before bonding; continuously advancing the composite strip toward a shearing station; sensing the successive markings along the advancing composite strip; and shearing sheets from the composite strip in response to said sensing of the markings so that the distance between the sheared edge of a sheared sheet and at least one of said markings remains constant.

17. In the fabrication of integral tubular circuit panels by inflating nonbonded zones included between two superposed sheets bonded by laminating along the remainder of their facing surfaces, in which two strips of material are continuously unrolled in facing relation with each other and outlines of the tubular circuit are automatically, regularly and successively printed on that surface of one strip that faces an opposing surface of the other strip, in regularly spaced relation and utilizing a bond-preventing printing substance; the improvement comprising marking a strip adjacent at least one edge thereof at locations coordinated with the circuit outlines imprinted thereon; superposing the strips; surface bonding the superposed strips by laminating under heat and pressure between a pair of pressure rolls thereby to produce a composite strip in which the distance between successive markings is greater than before bonding; continuously advancing the composite strip; sensing the successive markings along the advancing composite strip; and moving said rolls closer together in response to said sensed markings when the interval between said sensed markings decreases and moving said rolls farther apart in response to said sensed markings when the interval between said sensed markings increases thereby to correct variations in the thickness of said composite strip.

18. Apparatus for the automatic and continuous manufacture of intermediate panels comprising integrated tube-circuits, comprising means for delivering two strips continuously, means for printing on one of the opposite faces of said strips a tube-circuit pattern formed of a material which prevents adhesion of said faces, means for applying said strips against each other by rolling, means for marking said printed strip prior to rolling with a mark that is retained after rolling and which comprises in respect of each tube-circuit at least one marked position in a predetermined manner with respect to said circuit, means for cutting panels from the strip, means for detecting said mark after rolling but prior to cutting of the strip, and means for controlling said cutting operation as a function of the length of the strip which is delivered after transition of the mark which has thus been detected.

19. Apparatus as claimed in claim 18, said marking means comprising two markers which are capable of applying on the strip two marks corresponding respectively to the beginning and the end of each tube-circuit.

20. Apparatus as claimed in claim 19, said detecting means comprising at least one detector which is placed between the rolling means and the cutting means and which is capable of selectively detecting the passage of said mark, and a device for controlling the roll pressure in both magnitude and direction, said device being controlled by said detector.

21. Apparatus as claimed in claim 19, said rolling means comprising a rolling mill and means for controlling the roll pressure at each stand of the rolling mill, said marking means comprising three markers which are capable of applying on the strip respectively the marks of the beginning and end of a tube-circuit and a third mark in transverse alignment with one of the aforesaid marks and placed in the vicinity of the edge of the strip opposite to the edge which bears the aforesaid marks, said detecting means comprising at least two detectors which measure after the rolling operation the relative positional difference from one edge to the other between the two marks which were initially aligned, and means for controlling differentially the lateral roll pressure as a function of the measurement of said difference.

22. Apparatus as claimed in claim 18, said marking means comprising a moving cutting punch, said detecting means comprising a probe system.

23. Apparatus as claimed in claim 18, said marking means comprising a punching device for insetting by die stamping in the strip a metallic pellet of different composition.

24. Apparatus as claimed in claim 23, in which the inserted pellet is of magnetic metal, said detecting means comprising electromagnetic proximity detectors.

25. Apparatus as claimed in claim 23, said detecting means comprising a device for producing energetic radiation which passes through the strip in a location corresponding to the path of the mark and means for detecting said radiation which is influenced by the passage of the pellet.

26. Apparatus as claimed in claim 18, said marking means being adapted to deposit an ink which is charged with radioactive particles having a short half life, said detecting means comprising radioactivity counters.

27. Apparatus as claimed in claim 18, said marking means being carried by said printing means.

28. Apparatus as claimed in claim 18, said printing means comprising means for applying on the strip at least one intermediate mark which is printed in positional correlation with the tube-circuit, said marking means comprising a frame which is adapted to carry three markers placed downstream of the printing means, said detecting means comprising an optical electronic detector for detecting the printed intermediate mark, said optical electronic detector being adapted to control said markers.

29. Apparatus as claimed in claim 28, said marking means having a frame which carries said detecting means, said marking means including markers slidably mounted parallel to the strip, said frame comprising means for taking up play controlled by said optical electronic detector, means for advancing said frame in the same direction as the strip at a higher speed than the strip, and means for actuating the markers when the intermediate printed mark has been reached.

30. Apparatus as claimed in claim 20, said device for controlling the roll pressure comprising a device for measuring the rate of transfer of the strip after rolling, said measuring device being coupled to a counter which forms part of a computer and which is controlled by said detecting means for the marks corresponding to the beginning and end of tube-circuits, said computer being additionally adapted to comprise a comparator which is coupled to the counter and to a display device which serves to store the standard length and means for producing a signal which initiates the application of total roll pressure of the rolling means as a function of the signal delivered by said comparator.

31. Apparatus as claimed in claim 21, said detecting means comprising two detectors disposed on each side of the strip and coupled to a comparator of the relative displacement of reception of transverse marks, said comparator being adapted to control the means for differential application of roll pressure of said rolling mill.

32. Apparatus as claimed in claim 21, and a second rolling mill downstream of the first mill, said detecting means being disposed between the two rolling mills, said means for controlling roll pressure controlling said second rolling mill.

33. Apparatus as claimed in claim 18, said cutting means comprising a shearing machine of the fixed frame type, means for driving the strip at two speeds, said detecting means comprising two detectors which are serially mounted on the same mark path, the first detector being adapted to produce the low-speed transfer in order to permit accurate detection of the mark by the second detector.

34. Apparatus as claimed in claim 18, said controlling means comprising a measurement device coupled to a preselection counter which is triggered by said detecting means, said counter being adapted to initiate both the stopping of the drive of the strip and the starting of said cutting means.

References Cited

UNITED STATES PATENTS

| | | | |
|---|---|---|---|
| 1,466,404 | 8/1923 | Lober | 29—202 |
| 2,614,517 | 10/1952 | Peterson | 29—202 |
| 2,845,695 | 8/1958 | Grenell | 29—157.3 |
| 2,881,516 | 4/1959 | Hull et al. | 29—407 |
| 2,896,312 | 7/1959 | Schell | 29—407 X |
| 2,906,006 | 9/1959 | Neel | 29—157.3 |
| 2,958,939 | 11/1960 | Turner | 29—407 |

THOMAS H. EAGER, *Primary Examiner.*

U.S. Cl. X.R.

29—157.3, 202, 411, 417